United States Patent Office 2,736,717
Patented Feb. 28, 1956

2,736,717

COPOLYMERS OF VINYL AROMATIC COMPOUND, FATTY ACID ESTER OF EPOXY RESIN AND A VEGETABLE OIL

Charles Frazier, Yonkers, N. Y., assignor to American Cyanamid Company, New York, N. Y., a corporation of Maine No Drawing. Application March 29, 1952,
Serial No. 279,445

14 Claims. (Cl. 260—23)

This invention relates to a novel class of resinous materials and to the process of preparing the same. More particularly, this invention relates to the process for styrenating an acid ester of an epoxy resinous compound. Still further, this invention relates to a process for styrenating a fatty acid ester of an epoxy compound, in the presence of a semi-drying or drying glyceride oil, wherein said acid ester is prepared by coreacting the fatty acids of natural drying oils or semi-drying oils of their lower alkyl esters with the reaction product of a dihydric phenol and a difunctional halohydrin. Still further, this invention relates to the resinous reaction products produced in accordance with the process of the present invention.

One of the objects of the present invention is to produce a resinous reaction product of a styrene coreacted with an acid ester of certain epoxy compounds in the presence of a semi-drying or drying oil. A further object of the present invention is to produce a surface coating material by styrenating an acid ester of an epoxy compound. A still further object of the present invention is to produce a surface coating material having improved properties, such as improved adhesion to the object coated, improved, mar resistance, improved acid and alkali resistance, amongst other improved properties. These and other objects of the present invention will be discussed more fully hereinbelow.

In the practice of the process of the present invention, one could react a styrene with an acid ester of an epoxy resinous material in the presence of a mutually inert solvent having a boiling point above about 110° C. and having a Kauri-butanol value between about 24 and 100. In the coreaction, it is desirable to make use of a catalyst, particularly those which are generally classified as high-temperature catalysts, such as those that are most effective at temperatures between about 130–215° C. This temperature range is the range desired for carrying out the coreaction. The type of catalysts which are most representative of this type are those selected from the group consisting of tertiary alkyl substituted diperoxides and tertiary alkyl substituted hydroperoxides. In each instance, the peroxide group of the catalyst is directly attached to the tertiary alkyl group. The amount of catalyst which is used in the process of the present invention should vary between about 0.5–5% by weight based on the total weight of the coreaction materials. From an optimum operating standpoint, it is preferred to use from about 1 to 2% by weight of the catalyst of the class described, based on the weight of the coreaction materials. Amongst those catalysts which may be used are 2,2 - bis(tertiarybutylperoxy)butane, tertiarybutylhydroperoxide, ditertiarybutylperoxide, tertiarybutylpropylperoxide, tertiarybutylpentamethylethylperoxide and the like.

Any inert organic solvent which is mutually solvent to the styrene monomers, as well as to the acid ester of the epoxy resinous material may satisfactorily be used for practicing the process of the present invention. The solvent should have a boiling point above about 110° C. and should have a Kauri-butanol value between about 24–100. Representative of the class of solvents which may be used are the following hydrocarbon solvents: xylol, kerosene, Varsol No. 1, Varsol No. 2, Solesso No. 100, Solvasol No. 75, toluol, high-flash naphtha, heavy aromatic naphtha, Amsco F-80, ultracene and the like. It is actually preferred to employ those solvents having a Kauri-butanol value of 24–50, due to economical considerations and odor of product; and for optimum processing, a solvent having a Kauri-butanol value of 35–45 is preferred. It should also be kept in mind that the solvents in this range have utility, according to the teachings of this invention, whereas in prior art practices, aromatic solvents or aliphatic solvents in conjunction with terpenes must be used. Characteristics of the solvents mentioned hereinabove are given in more detail in the following table:

CHARACTERISTICS OF HYDROCARBON SOLVENTS DISTILLATION RANGE °F.

| Solvent | Manufacturer | Specific Gravity | Initial Boiling Point | Temperature at 50% | Temperature at 90% | Final Boiling Point | Kauri-Butanol Value Toluene=100 | Aniline Point, ° F. |
|---|---|---|---|---|---|---|---|---|
| Xylol | Standard Oil of New Jersey | | 276 | 284 | 288 | 292 | 93 | [1] 51 |
| Solvesso No. 100 | do | .875 | 306 | 317 | 387 | 343 | 90 | [1] 54 |
| Solvasol | Socony Vacuum Oil Company | .872 | 325 | 348 | 369 | 386 | 77 | [1] 82 |
| Solvesso No. 150 | | .892 | 375 | 387 | 392 | 410 | 83 | 68 |
| Varsol No. 1 | Standard Oil of New Jersey | .788 | 305 | 342 | 367 | 392 | 36 | 132 |
| Varsol No. 2 | do | .802 | 310 | 341 | 367 | 403 | 43 | 110 |
| Toluol | | .869 | 227 | 231 | 232 | 233 | 100 | 50 |
| | | .868 | 320 | 333 | 345 | 365 | 90 | |
| Hi-Flash Naphtha Kerosene | Standard Oil of New Jersey | | 338 | 429 | 496 | 532 | 32 | 152 |
| Heavy Aromatic Naphtha | | .924 | 313 | 404 | 482 | 526 | 85 | 77 |
| Ultracene | Atlantic Refining Co. | | 390 | | | 490 | 27 | |
| Amsco F-80 | | .860 | 328 | 343 | | 412 | 80 | 80 |

[1] Mixed aniline point, ° F.

In order that the present invention may be more completely understood, the following examples are set forth in which all parts are parts by weight. It should be remembered that these examples are set forth solely for the purpose of illustration and any specific enumeration of detail therein should not be interpreted as limitations on the case, except as indicated in the appended claims.

EXAMPLE 1

Resin A 115 parts of epichlorohydrin (1.25 mols) and 228 parts of 2,2-diparahydroxyphenylpropane (1 mol) are introduced into a suitable reaction chamber equipped with reflux condenser, thermometer and stirrer. The mixture is heated to 55° C. for 20 minutes, whereupon 200 parts of a 30% aqueous solution of sodium hydroxide are added dropwise at 55° C. over about a 30 minute period. The temperature is then elevated to 100° C. and 700 parts of water are then introduced into the sphere of reaction.

The water is allowed to mix with the reaction product for 10 minutes, whereupon the water is decanted and this washing step may be repeated until the resin is substantially salt free, as determined by the silver nitrate test. The salt free filtrate is then introduced into another reaction vessel and concentrated under a vacuum of 55 cm. at temperatures up to about 110° C. When the reaction product reaches 110° C., it is held at that temperature for about 20 minutes, discharged and cooled. The resin thus prepared has a melting point of about 95–105° C.

Acid ester of Resin A 66.5 parts of Resin A and 98 parts of talloil fatty acids (Armour's D–142) are introduced into a suitable reaction chamber and heated until the esterification is sufficiently complete, as indicated by an acid number of about 8.

EXAMPLE 1

36 parts of the acid ester of Resin A are introduced into a suitable reaction chamber equipped with thermometer, stirrer and reflux condenser. To this acid ester there is added 36 parts of dehydrated castor oil, 48 parts of styrene and 80 parts of Varsol No. 2 are then added, together with 1% by weight of ditertiarybutylperoxide. The reaction mixture is then heated to the reflux temperature and maintained at that temperature for a period of about 5 hours. The resulting resin solution had a viscosity of V–W on the Gardner-Holdt scale at 25° C.

EXAMPLE 2

30 parts of the acid ester of Resin A are mixed with 30 parts of dehydrated castor oil, 40 parts of styrene and 100 parts of Varsol No. 2 are introduced into a suitable reaction chamber equipped with thermometer, stirrer and reflux condenser, together with about 1% by weight of ditertiarybutylperoxide and the reaction mixture is heated at the reflux temperature for about 4 hours at which time the polymerization of the styrene is substantially complete.

EXAMPLE 3

45 parts of the acid ester of Resin A, 45 parts of dehydrated castor oil and 100 parts of Varsol No. 2 are introduced into a suitable reaction chamber equipped as before and the charge is heated to the reflux temperature. A solution of 1.5 parts of ditertiarybutylperoxide in 60 parts of styrene is then added at the reflux temperature over a 1 hour period. The resulting solution is maintained at reflux for an additional 4 hour period. The final viscosity on the Gardner-Holdt scale at 25° C. was T+.

EXAMPLE 4

49 parts of the acid ester of Resin A, 49 parts of the pentaerythritol esters of talloil fatty acids and crotonic acid (4:1, respectively) and 60 parts of Varsol No. 2 are introduced into a suitable reaction chamber as before and a solution of 1.4 parts of ditertiarybutylperoxide in 42 parts of styrene are then added as before. The procedure in this example is the same as that set forth in Example 3, except that the additional reflux period was 5 hours. The resulting resinous solution had the following characteristics: viscosity Z–3+ on the Gardner-Holdt scale at 25° C., solids 68.8% (theoretical, 70%); Varsol No. 1 tolerance, 290 grams/11 g. resin solution; and percentage of conversion of monomer to polymer, 96.5%.

EXAMPLE 5

Example 4 is repeated, in which the following materials were used: 273 parts of the acid ester of Resin A, 273 parts of the pentaerythritol esters of talloil fatty acids and crotonic acid (4:1, respectively), 420 parts of Varsol No. 2, 234 parts of styrene containing 7.8 parts of ditertiarybutylperoxide. At the completion of the reaction, the resulting product had the following characteristics: viscosity, Y (Gardner-Holdt); solids, 64.5% (theoretical, 65%); conversion of monomer to polymer, 99.3%; color, 10+ Gardner-Holdt; Varsol No. 1 tolerance, 420 g./10 g. resin solution; and Varsol No. 2 tolerance, infinite.

The use of crotonic acid in this example is for the purpose of illustrating that a compound of this type may be used as a chain transfer agent. Other compounds which may be used for this purpose are α methyl styrene, terpenes such as dipentane, limonene and the like.

It has been indicated hereinabove that the present process may be carried out in which a styrene monomer may be used as one of the starting materials. It is actually preferred that styrene per se be the monomeric styrene used; but nevertheless, one could readily make use of the ring-substituted styrenes, such as the ring-substituted alkyl styrenes and the ring-substituted halostyrenes. Illustrative of these types of styrenes are the ortho, meta and para alkyl styrenes, or the ortho, meta and para halostyrenes. More specifically, these styrenes are represented by the following: ortho-methylstyrene, meta-ethylstyrene, para-propylstyrene, 2,4-dimethylstyrene, 2,5-diethylstyrene, 3,5-dibutylstyrene, ortho-chlorostyrene, para-chlorostyrene, ortho-bromostyrene, 2,4-dichlorostyrene, 2,5-dichlorostyrene, and the like.

Among the dihydric phenols which may be used in the preparation of resin comparable to Resin A, one may use such compounds as resorcinol, diphenylol propane and the bis-phenols and the like. Among the bis-phenols which may be used are 2,2-di(4-hydroxyphenyl)propane, p,p'-dihydroxybenzophenone, p,p'-dihydroxydiphenol,p,p'-dihydroxydibenzyl, o,p,o',p'-tetrahydroxydiphenyldimethylmethane and the like.

In the preparation of the epoxy resinous material which is utilized in the present invention, it is immaterial which of the epihalohydrins or the alpha-dihalohydrins are selected, because the resultant end product is substantially free from the halogen ion when the preparation has been completed. The difunctional halohydrins which can be used for reaction with the dihydric phenols in the preparation of one of the components of the present invention are epichlorohydrin, epibromohydrin, epifluorohydrin, epiiodohydrin, alpha-dichlorohydrin, alpha-dibromohydrin, alpha-diiodohydrin and alpha-difluorohydrin. The mol ratios of the dihydric phenols to the halohydrins should be in the range of about 1:1–1:2, respectively. As a general rule, when the ratio of the halohydrin to the dihydric phenol is increased, the melting point of the resultant resinous material decreases, so that for reaction products of epichlorohydrin and bis-phenol, in mol ratios of approximately 2:1, respectively, one would have a melting point in the order of about 15–45° C. For mol ratios of about 1.5:1, respectively, one would have a melting point of about 65–75° C. For mol ratios of about 5:4, respectively, one would have a melting point of about 95–105° C. and as the mol ratio approaches 1:1, one would have melting points in the order of about 125–135° C. Factors other than mol ratios will tend to vary these melting points, however, such as variations in reaction conditions and time.

The fatty acids or lower alkkyl esters of said fatty acids which may be used to esterify the epoxy resinous material are those derived from unsaturated vegetable oils selected from the class consisting of drying and semi-drying oils. Among the various oil acids which may be used singly, or in combination, as esterification agents for the epoxy resinous material are those derived from chinawood oil, dehydrated castor oil, linseed oil, perilla oil, soya oil, cotton oil, corn, cottonseed oil, talloil, i. e., distilled talloil fatty acids and the like. In addition to the use of these acids, one may make use of the lower alkyl esters thereof such as the methyl, ethyl, propyl, isopropyl, butyl tertiary butyl esters and the like. The amount of acid used to esterify the epoxy resinous material may vary between about stoichiometrical amounts of acid to epoxy resinous material up to about 100% excess of the epoxy resinous material, over and beyond the theoretical stoichiometrical amounts required.

In coreacting the styrene type monomer with the acid ester of the epoxy resinous material, one may use between about 1% and 50% by weight of the styrene-type compound, based on the total weight of the styrene-type compound and the acid ester of the epoxy resinous material. Preferably, one should use between about 20% and 45% by weight of the styrene type compound based on the total weight of the reactants.

In the examples set forth hereinabove, it has been illustrated that in the preparation of the products of the present invention, one should styrenate the acid ester of the epoxy resinous material in the presence of certain of the semi-drying or drying oils. Varying amounts of these drying and semi-drying oils may be added to the sphere of reaction in order to alter the flexiblity of the products produced. One may add, for instance, these semi-drying and drying glyceride oils in amounts varying between about 1:10 in parts by weight and 3:1 resin ester to oil, respectively. Preferably, one should use approximately equal parts by weight. In choosing an oil for this purpose, one would be able to select any of the oils referred to hereinabove from which the fatty acids are derived for the purpose of esterifying the epoxy resinous material.

Reference is made to the copending application, Serial No. 279,444, filed March 29, 1952 in the name of the present applicant and John H. Daniel, Jr.

I claim:

1. A process which comprises coreacting at a temperature between 130–215° C., a styrene selected from the group consisting of styrene and ring-substituted alkyl and halo styrenes and an acid ester of an epoxy resinous material in a mutually inert solvent having a boiling point above 110° C. and a Kauri-butanol value between about 24 and 100, in the presence of (1) a catalyst selected from the group consisting of tertiary alkyl substituted diperoxides and ditertiary alkyl substituted peroxides and tertiary alkyl substituted hydroperoxides and (2) a material selected from the group consisting of drying and semi-drying oils, wherein said ester is the reaction product of an epoxy compound with a member selected from the group consisting of the fatty acids of natural drying oils, semi-drying oils and the lower alkyl ester of said fatty acids and wherein said epoxy compound is the resinous reaction product of a dihydric phenol and a difunctional halohydrin.

2. A process which comprises coreacting at a temperature between 130–215° C., styrene and an acid ester of an epoxy resinous material in a mutually inert solvent having a boiling point above 110° C., and a Kauri-butanol value between about 24 and 100, in the presence of (1) a catalyst selected from the group consisting of tertiary alkyl substituted diperoxides ditertiary alkyl substituted peroxides and tertiary alkyl substituted hydroperoxides and (2) a material selected from the group consisting of drying and semi-drying oils, wherein said ester is the reaction product of an epoxy compound and a member selected from the group consisting of the fatty acids of natural drying oils, semi-drying oils and the lower alkyl esters of said fatty acids and wherein said epoxy compound is the resinous reaction product of a dihydric phenol and a difunctional halohydrin.

3. A process which comprises coreacting at a temperature between 130–215° C., a ring-substituted alkyl styrene and an acid ester of an epoxy resinous material in a mutually inert solvent having a boiling point above 110° C., and a Kauri-butanol value between about 24–100, in the presence of (1) a catalyst selected from the group consisting of tertiary alkyl substituted diperoxides, ditertiary alkyl substituted peroxides and tertiary alkyl substituted hydroperoxides and (2) a material selected from the group consisting of drying and semi-drying oils, wherein said ester is the reaction product of an epoxy compound with a member selected from the group consisting of the fatty acids of natural drying oils and semi-drying oils and the lower alkyl esters of said fatty acids and wherein said epoxy compound is the resinous reaction product of a dihydric phenol and a difunctional halohydrin.

4. A process which comprises coreacting at a temperature between 130–215° C., a ring-substituted halo styrene and an acid ester of an epoxy resinous material in a mutually inert solvent having a boiling point above 110° C. and a Kauri-butanol value between about 24 and 100, in the presence of (1) a catalyst selected from the group consisting of tertiary alkyl substituted diperoxides, ditertiary alkyl substituted peroxides and tertiary alkyl substituted hydroperoxides, and (2) a material selected from the group consisting of drying and semi-drying oils, wherein said ester is the reaction product of an epoxy compound with a member selected from the group consisting of the fatty acids of natural drying oils and semi-drying oils and the lower alkyl esters of said fatty acids and wherein said epoxy compound is the resinous reaction product of a dihydric phenol and a difunctional halohydrin.

5. A process which comprises coreacting at a temperature between 130–215° C., styrene and an acid ester of an epoxy resinous material in a mutually inert solvent having a boiling point above 110° C., and a Kauri-butanol value between about 24–100, in the presence of (1) a catalyst selected from the group consisting of tertiary alkyl substituted diperoxides and ditertiary alkyl substituted peroxides and tertiary alkyl substituted hydroperoxides and (2) a material selected from the group consisting of drying and semi-drying oils, wherein said ester is the reaction product of an epoxy compound with a member selected from the group consisting of the fatty acids of natural drying oils and semi-drying oils and the lower alkyl esters of said fatty acids and wherein said epoxy compound is the resinous reaction product of a bis-phenol and epichlorohydrin.

6. A process which comprises coreacting at a temperature between 130–215° C., styrene and an acid ester of an epoxy resinous material in a mutually inert solvent having a boiling point above 110° C. and a Kauri-butanol value between about 24–100, in the presence of (1) a catalyst selected from the group consisting of tertiary alkyl substituted diperoxides, ditertiary alkyl substituted peroxides and tertiary alkyl substituted hydroperoxides, and (2) a material selected from the group consisting of drying and semi-drying oils, wherein said ester is the reaction product of an epoxy compound with a member selected from the group consisting of the fatty acids of natural drying oils and semi-drying oils and the lower alkyl esters of said fatty acids and wherein said epoxy compound is the resinous reaction product of 2,2-di (parahydroxyphenol) propane and epichlorohydrin.

7. A process which comprises coreacting at a temperature between 130–215° C., styrene and an acid ester of an epoxy resinous material in a mutually inert solvent having a boiling point above 110° C. and a Kauri-butanol value between about 24–100, in the presence of (1) a catalyst selected from the group consisting of tertiary alkyl substituted diperoxides and ditertiary alkyl substituted peroxides and tertiary alkyl substituted hydroperoxides, and (2) a material selected from the group consisting of drying and semi-drying oils, wherein said ester is the reaction product of an epoxy compound with dehydrated castor oil fatty acids and wherein said epoxy compound is the resinous reaction product of a bis-phenol and epichlorohydrin.

8. A process which comprises coreacting at a temperature between 130–215° C. styrene and an acid ester of an epoxy resinous material in a mutually inert solvent having a boiling point above 110° C. and a Kauri-butanol value between about 24–100 in the presence of (1) a catalyst selected from the group consisting of tertiary alkyl substituted diperoxides ditertiary alkyl substituted peroxides and tertiary alkyl substituted hydroperoxides, (2) a material selected from the group consisting of drying and semi-drying oils, wherein said ester is the reaction product of an epoxy compound with dehydrated castor oil fatty acids, and wherein said epoxy compound is the resinous reaction product of 2,2-di(parahydroxyphenol)propane and epichlorohydrin.

9. A composition of matter comprising the reaction product of a styrene selected from the group consisting of styrene and ring-substituted alkyl and halo styrenes and an acid ester of an epoxy resinous material, and a material selected from the group consisting of semi-drying and drying oils, wherein said acid ester is the esterification product of the reaction product of a dihydric phenol and a difunctional halohydrin with a member selected from the group consisting of the fatty acids of natural drying oils, semi-drying oils and the lower alkyl esters of said fatty acids.

10. A composition of matter comprising the reaction product of styrene and an acid ester of an epoxy resinous material, and a material selected from the group consisting of semi-drying and drying oils, wherein said acid ester is the esterification product of the reaction product of dihydric phenol and a difunctional halohydrin with a member selected from the group consisting of the fatty acids of natural drying oils, semi-drying oils and the lower alkyl esters of said fatty acids.

11. A composition of matter comprising the reaction product of styrene and an acid ester of an epoxy resinous material, and a material selected from the group consisting of semi-drying and drying oils, wherein said acid ester is the esterification product of the reaction product of a bisphenol and epichlorohydrin, with a member selected from the group consisting of the fatty acids of natural drying oils, semi-drying oils and the lower alkyl esters of said fatty acids.

12. A composition of matter comprising the reaction product of styrene and an acid ester of an epoxy resinous material, and a material selected from the group consisting of semi-drying and drying oils, wherein said acid ester is the esterification product of the reaction product of 2,2-di(parahydroxyphenyl) propane and epichlorohydrin with a member selected from the group consisting of the fatty acids of natural drying oils, semi-drying oils and the lower alkyl esters of said fatty acids.

13. A process which comprises reacting at a temperature between 130–215° C. styrene and an acid ester of an epoxy resinous material in mineral spirits in the presence of (1) tertiary butyl peroxide and (2) dehydrated castor oil wherein said ester is the reaction product of an epoxy compound with talloil fatty acids and wherein said epoxy compound is the resinous reaction product of 2,2-di(p-hydroxyphenyl)propane and epichlorohydrin.

14. A composition of matter comprising the reaction product of styrene and an acid ester of an epoxy resinous material and dehydrated castor oil, wherein said acid ester is the esterification product of the reaction product of 2,2-di(p-hydroxyphenyl)propane and epichlorohydrin with talloil fatty acids.

References Cited in the file of this patent

UNITED STATES PATENTS 2,596,737    Tess et al. _____ May 13, 1952